(12) United States Patent
Balkau

(10) Patent No.: US 10,638,872 B2
(45) Date of Patent: May 5, 2020

(54) MILK FROTHER APPLIANCE, DRINKS PREPARATION SYSTEM AND A DRINKS PREPARATION MACHINE

(71) Applicant: Qbo Coffee GmbH, Wallisellen (CH)

(72) Inventor: Werner Balkau, Schwändi (CH)

(73) Assignee: Qbo Coffee GmbH, Wallisellen (CH)

( * ) Notice: Subject to any disclaimer, the term of this patent is extended or adjusted under 35 U.S.C. 154(b) by 377 days.

(21) Appl. No.: 15/513,203

(22) PCT Filed: Sep. 22, 2015

(86) PCT No.: PCT/EP2015/071795
§ 371 (c)(1),
(2) Date: Mar. 22, 2017

(87) PCT Pub. No.: WO2016/046239
PCT Pub. Date: Mar. 31, 2016

(65) Prior Publication Data
US 2017/0303732 A1 Oct. 26, 2017

(30) Foreign Application Priority Data
Sep. 24, 2014 (EP) .................................. 14186265

(51) Int. Cl.
*A47J 31/44* (2006.01)
(52) U.S. Cl.
CPC ........... *A47J 31/4485* (2013.01); *A47J 31/44* (2013.01); *A47J 31/4489* (2013.01); *A47J 31/4496* (2013.01)
(58) Field of Classification Search
CPC .. A47J 31/4496; A47J 31/462; A47J 31/4489; A47J 31/4485

USPC .......... 99/293, 323.1; 261/DIG. 16, DIG. 26, 261/DIG. 76
See application file for complete search history.

(56) References Cited

U.S. PATENT DOCUMENTS

2009/0101021 A1* 4/2009 Tonelli ................ A47J 31/4485
99/290
2013/0319259 A1* 12/2013 Ait Bouziad ....... A47J 31/4485
99/453

FOREIGN PATENT DOCUMENTS

| CN | 1817280 | 8/2006 | |
|---|---|---|---|
| CN | 101786589 | 7/2010 | |
| CN | 102123638 | 7/2011 | |
| DE | 10 2007 024 443 | 11/2008 | |
| EP | 1658796 A2 * | 5/2006 | ............. A47J 31/36 |
| EP | 2 047 779 | 4/2009 | |

(Continued)

OTHER PUBLICATIONS

English translation of International Preliminary Report on Patentability dated Mar. 28, 2017 (Mar. 28, 2017), Application No. PCT/EP2015/071795, 7 pages.

(Continued)

*Primary Examiner* — Reginald Alexander
(74) *Attorney, Agent, or Firm* — Rankin, Hill & Clark LLP

(57) ABSTRACT

An appliance for preparing frothed milk includes a container for receiving milk, and an electrically operated drive for delivering and/or frothing the milk. The appliance includes a docking element for connection to a drinks preparation machine. The docking element includes a connection for steam delivered by the drinks preparation machine, —an interface for electrical current supplied by the drinks preparation machine, and a milk froth outlet for the frothed milk.

15 Claims, 11 Drawing Sheets

(56) References Cited

FOREIGN PATENT DOCUMENTS

| | | | |
|---|---|---|---|
| EP | 2 220 972 | 8/2010 | |
| EP | 2 220 973 | 8/2010 | |
| EP | 2 245 969 | 11/2010 | |
| EP | 2 272 408 | 1/2011 | |
| FR | 3056896 A1 * | 4/2018 | .......... A47J 31/4482 |
| WO | 2011/144647 | 11/2011 | |
| WO | 2014/044407 | 3/2014 | |

OTHER PUBLICATIONS

English translation of Chinese Office Action dated Jan. 28, 2019, Application No. 201580051027.6, 9 pages.
English translation of Chinese Office Action dated Oct. 21, 2019, Application No. 201580051027.6; 10 pages.

* cited by examiner

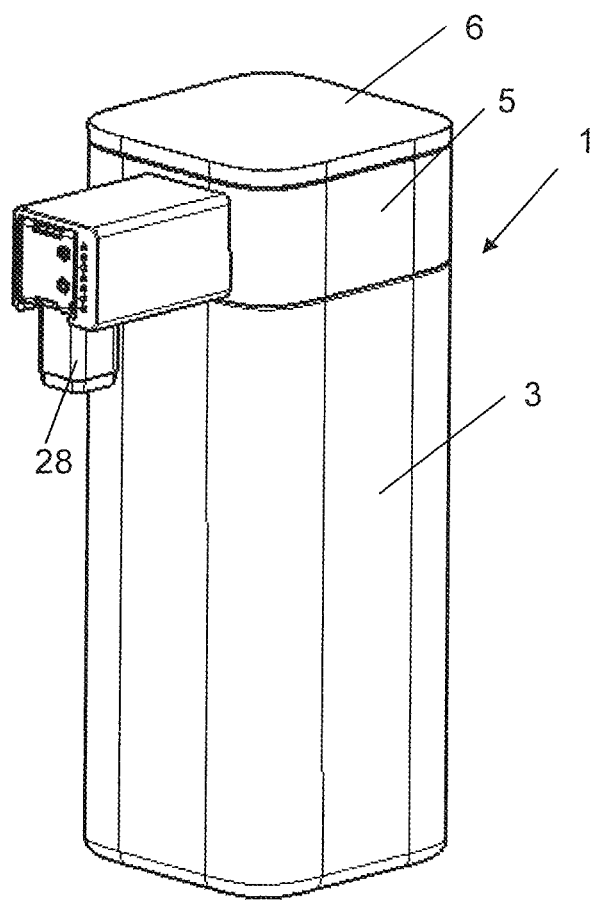
Fig. 1
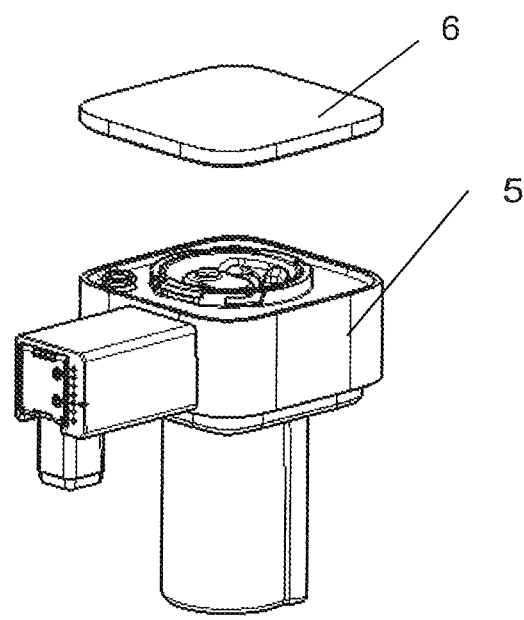
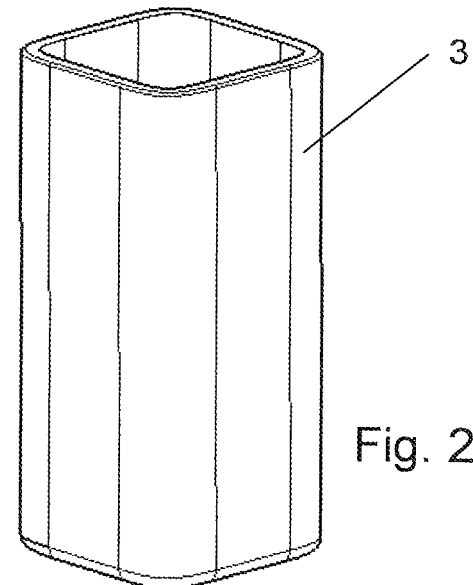
Fig. 2

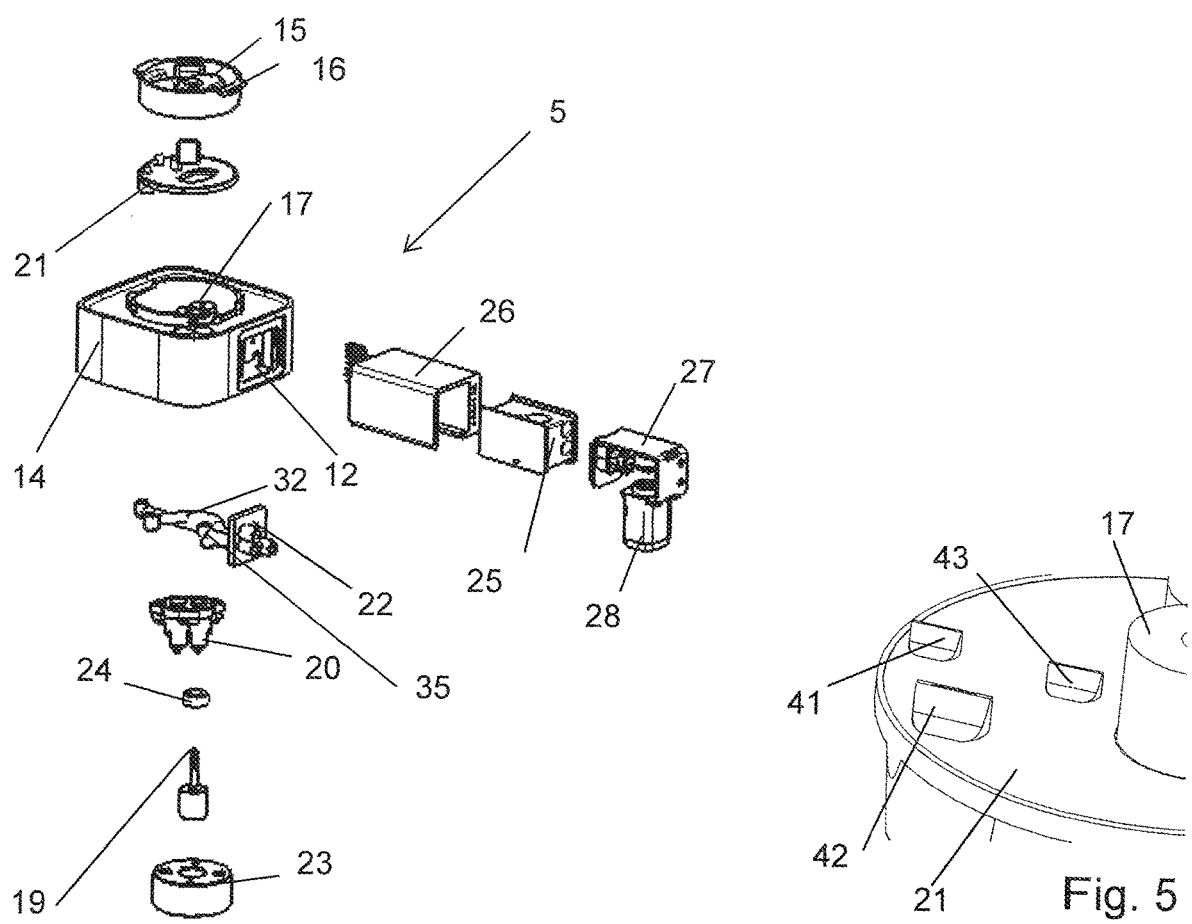
Fig. 3
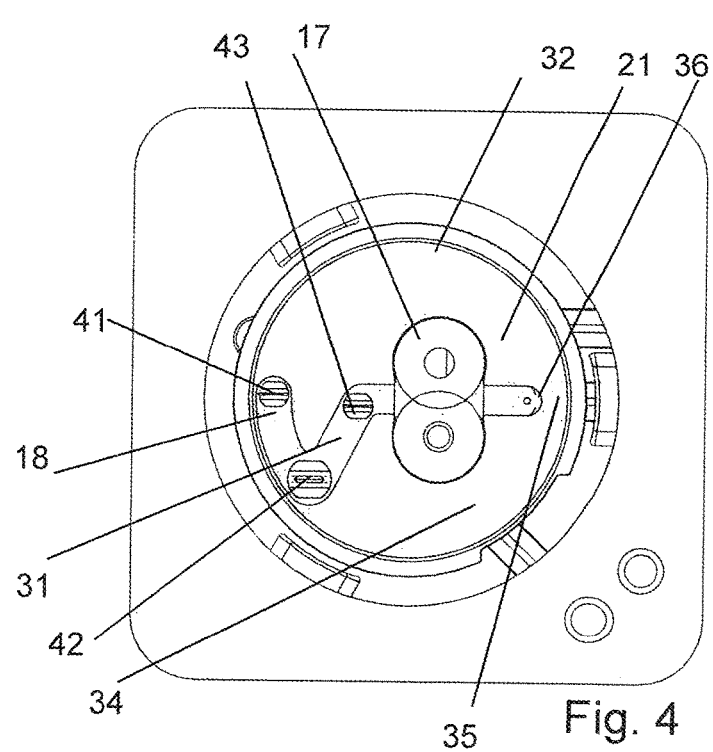
Fig. 5
Fig. 4

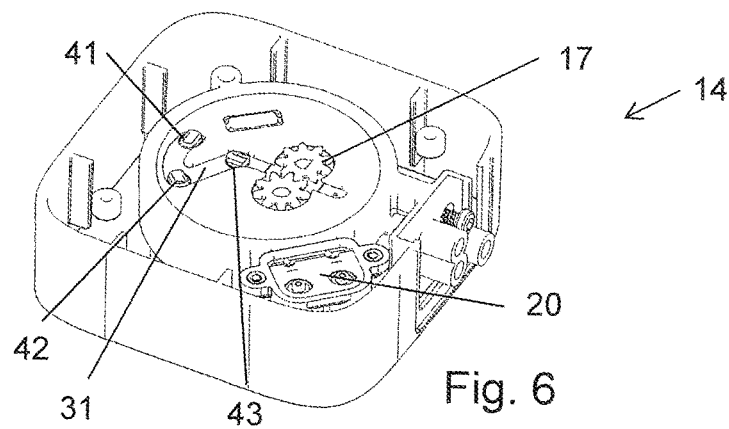
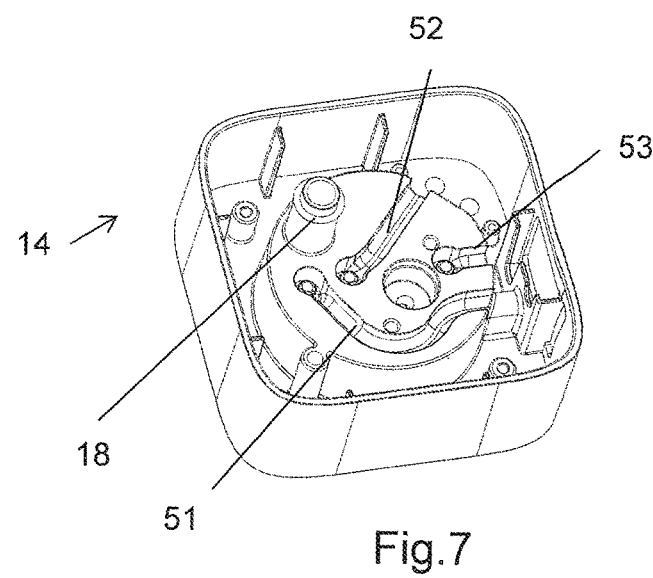
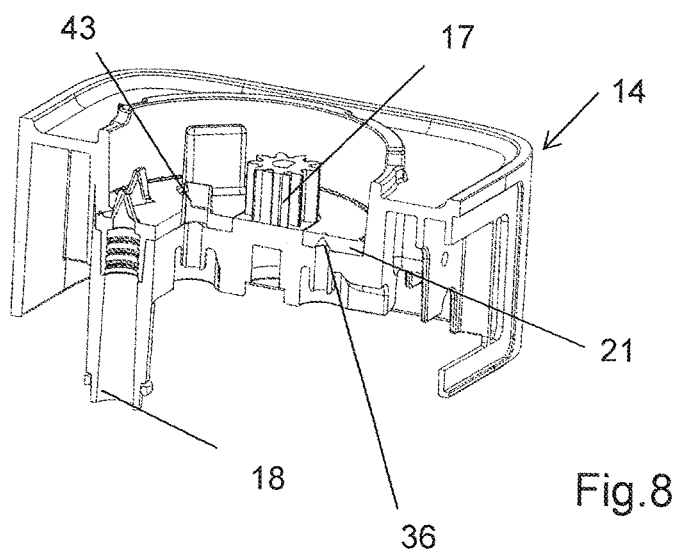

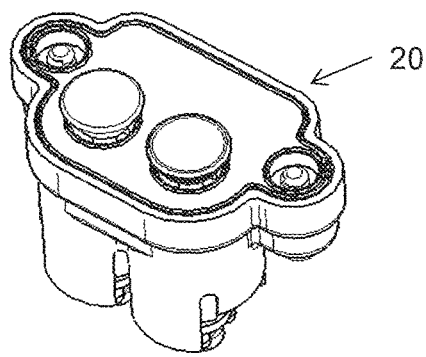
Fig. 9
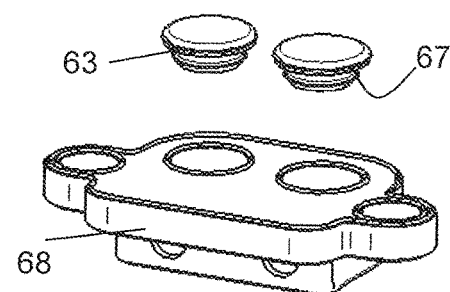
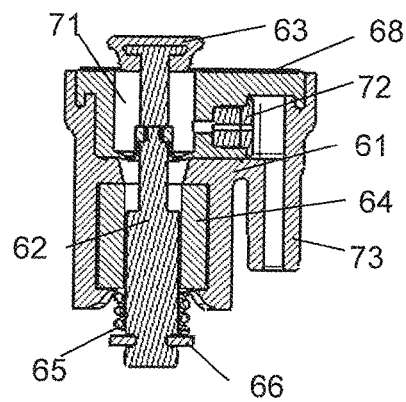
Fig. 11c
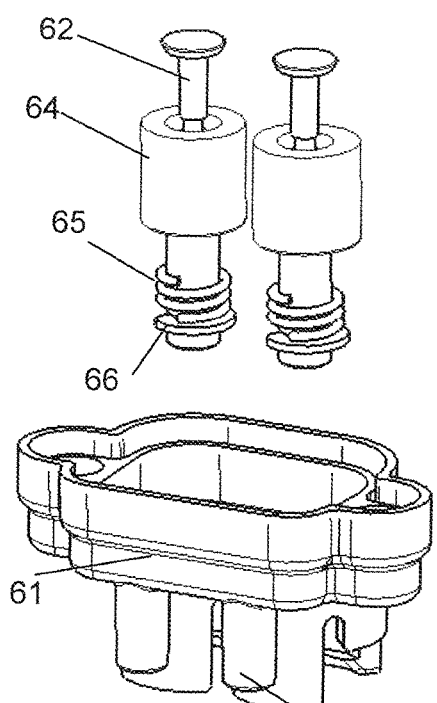
Fig. 10
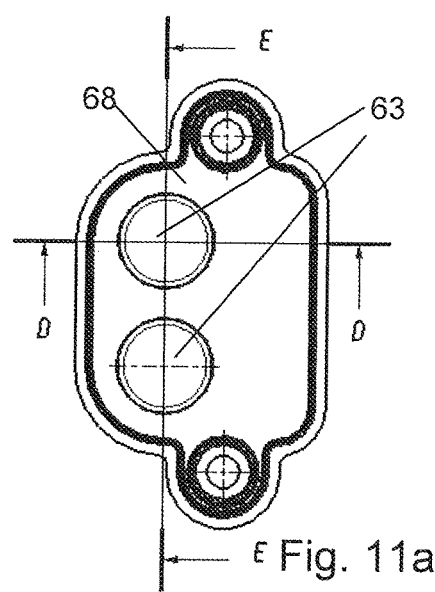
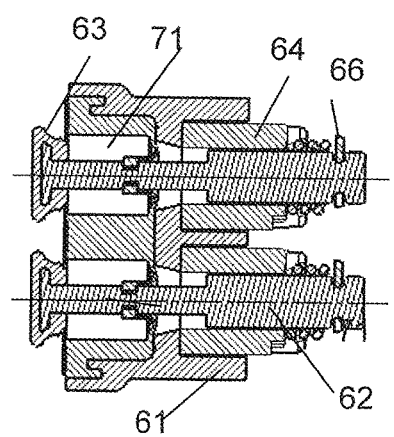
Fig. 11a   Fig. 11b

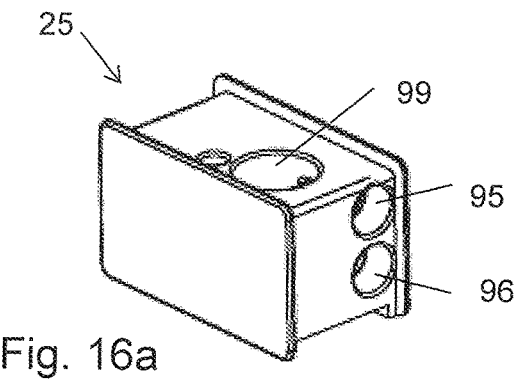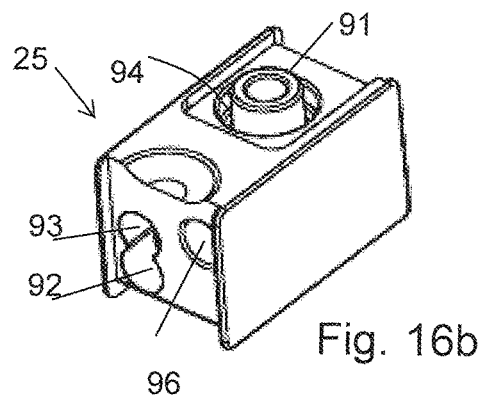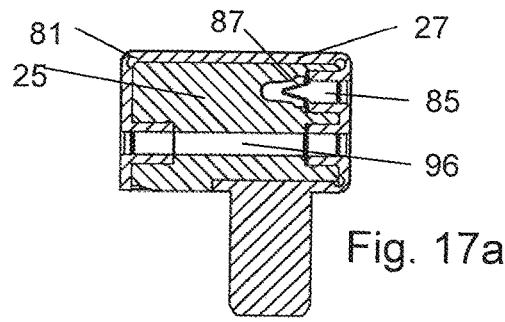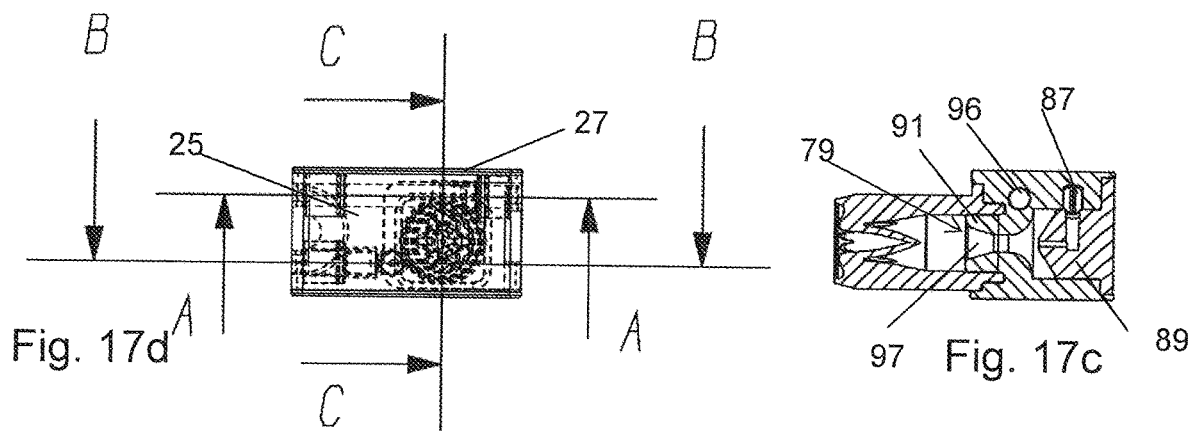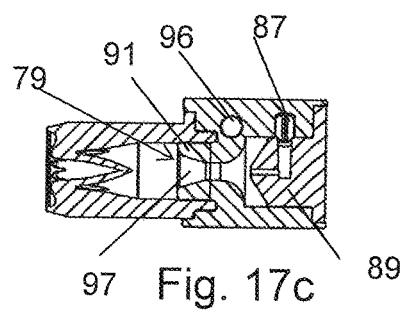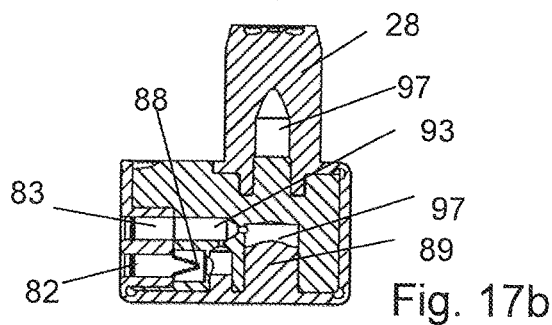

MILK FROTHER APPLIANCE, DRINKS PREPARATION SYSTEM AND A DRINKS PREPARATION MACHINE

BACKGROUND OF THE INVENTION

Field of the Invention

The invention generally relates to the field of appliances for preparing drinks and, more particularly, to an appliance for producing milk froth and milk drinks, to a drinks preparation system as well as to a drinks preparation machine.

Description of Related Art

Milk frother appliances as integrated modules of coffee machines or as separate appliances that are dockable onto coffee machines are known. EP 2 047 779 discloses a coffee machine with a dockable milk module, wherein hot steam from the coffee machine is used to froth milk, which is sucked out of a vessel of the milk module according to the Venturi principle. The frothed milk is dispensed via a pivotable arm. EP 2 220 973 shows a coffee machine with a dispensing device for milk froth. The acting manner of the dispensing device is likewise based on the Venturi effect, on account of which milk is sucked out of a separate vessel by way of hot steam injected into the Venturi nozzle, is swirled with air and is thus frothed up. The dispensing device is integrated into the housing of the coffee outlet, but is arranged such that milk does not need to be led further into the inside of the coffee machine, so that its parts can be cleaned separately. Despite this, the principle is based on milk being processed in the inside of the coffee machine housing, which demands more effort on the part of the user for cleaning.

The appliances which are described above and which are based on the Venturi principle, however, are only capable of preparing hot milk froth. However, the preparation of cold milk froth is often also desirable. WO 2014/044407 shows a device for the selective preparation of cold or warm milk froth, the device being able to be coupled onto the steam outlet of a drinks preparation machine, for producing the warm milk froth. The device has its own electricity supply connection. WO 2011/144647 discloses a coffee machine with a removable, electrically driven milk preparation module that is arranged on a base of the coffee machine. The module is activated and supplied with current via a base of the coffee machine. The module has a pour-out, by way of which the prepared, in particular frothed milk can be filled into a vessel after removal of the module. With these solutions, the user must create the milk froth separately from the hot drink and, as the case may be, himself mix it with the hot drink—in particular coffee.

SUMMARY OF THE INVENTION

An object of the present invention is to provide an appliance for producing milk froth, which overcomes disadvantages of the state of the art and which is optimised for cooperating with an appliance for preparing hot drinks, in particular with a coffee machine. A further object is the provision of a corresponding drinks preparation machine, in particular coffee machine, which cooperates with the appliance, as well as the provision of a system with an appliance for producing milk froth and with a drinks preparation machine.

The appliance for preparing frothed milk includes a container for receiving milk, and an electrically operated drive device for delivering and/or frothing the milk. It is characterised by a docking element for connection onto a drinks preparation machine, the docking element including:
- a connection for steam delivered from the drinks preparation machine;
- an interface for electrical current supplied from the drinks preparation machine; and
- a milk froth outlet for the frothed milk.

A particularly compact coupling between the drinks preparation machine and the milk frother appliance and one which is practical and simple in its handling is rendered possible by way of this approach. Due to the fact that the docking element also includes the milk froth outlet, this outlet in particular can be situated very close to the drinks preparation machine, and can lie closely to the drinks outlet of this drinks preparation machine given a suitable design of this. The distance between the milk froth outlet and the drinks outlet in particular can be such that a drinks vessel of common dimensions—for example a coffee cup or a Latte-macchiato glass—can be placed below both these outlets.

Typical drinking vessels for hot drinks with milk have a diameter of 6-8 cm or more. The drinks preparation system with the milk frother appliance and with the drinks preparation machine is preferably designed such that the distance between the hot drink outlet and the milk froth outlet is so small, that such a vessel can be filled with the hot drink and with the frothed milk in one and the same position. The distance between the hot drink outlet and the milk froth outlet is therefore preferably maximal 5 cm, in particular maximal 4 cm or maximal 3 cm. Here, what is meant by the distance is the horizontal distance, i.e. the distance of the exit points of the drink or the frothed milk, in a projection along the vertical onto a horizontal plane. For the milk frother appliance, this can mean that a distance between the milk froth outlet on the one hand and an end surface of the docking element on the other hand, the end surface including the connection for the steam and the electrical interface, is maximal 2.5 cm, in particular maximal 2 cm or maximal 1.5 cm The docking element can be designed, for example, as a continuous, body-forming element, in the inside of which conduits for milk and steam run. In an embodiment, it includes a body, wherein the mentioned conduits are designed as openings in this docking element body or are present in this as separate tubes or pipes. It can additionally include a housing. The leads for the electrical current then for example run on the housing, in the housing and/or between the housing and the body.

In embodiments, the docking element body includes a main body with a plurality of fluid channels and a supplementary part, which is reversibly removable from the main body, wherein the supplementary part includes a material, which is softer compared to the main body, is continuous and includes several elements, through which milk, steam, water and/or air can flow and which engage into the fluid channels.

In these embodiments, the supplementary part in particular can be constructed as one piece from an elastically and/or plastically deformable, comparatively soft material. "Deformable" here, for example, means that the material can be manually substantially deformed by the average user without aids and without an excessive force effort.

The supplementary part can be designed, for example, as a silicone part. As is known per se, silicones are suitable for applications in the field of foodstuffs, since apart from their deformability, they can also be heated and are inert and can therefore be easily cleaned, for example also in a dishwasher.

The supplementary part in particular can be arranged in a manner at least partly embracing the main body and can be unravelled from this. It can include an extensive or two-dimensionally frame-like base and on this, the through-flow elements. The base of this supplementary part is thereby laid around the main body in a folded and/or bent manner.

Such a base of the supplementary part in particular can be formed from flat sections with joints that are arranged between the extensive (flattish) sections. Such joints can be formed by slots and/or recesses in the base and be designed as rotation joints (hinges) with only one degree of freedom.

The directions, in which flow can pass through the different elements, can be different, for example, by way of the elements being present at different sides of the main body.

In embodiments, the supplementary part in particular is designed such that amongst others, it bears on two oppositely lying sides of the main body and includes elements for example of the mentioned type.

In embodiments, at least one nozzle and/or a valve is/are amongst the elements, i.e. the supplementary part forms at least one nozzle and/or valve. The nozzle or the valve can project completely or partly into a fluid channel in the main body or include a collar projecting into such a channel. One example of a valve is a duckbill valve.

Such elements in the form of a nozzle and/or a valve form narrowings on account of their function, and the part of the fluid channel behind such a narrowing is difficult to clean. However, a regular and thorough cleaning is important for elements that come into contact with milk. The approach according to the invention permits these elements to be removed and exposed in a simple manner for the cleaning, by way of the supplementary part being separated from the main body. Since the supplementary part includes the several elements, despite this they also remain integrally together for the cleaning, do not get lost and can be re-inserted in simple manner, and specifically without incorrect assemblies being possible.

The main body can be manufactured, for example, of a plastic and be manufactured, for example, in the injection moulding method, but other materials and manufacturing methods, for example ceramic materials or stainless steel, can also be considered. The main body can be of one piece, but this is not a necessity. The main body, for example, can be manufactured from a material block, wherein the fluid channels can be lined with a material that is different from the material of the material block. One moreover also does not rule out the through-flow elements of the supplementary part engaging so far into the respective fluid channels in the assembled condition, that these also form a lining of the fluid channels and at least regionally prevent a contact between the fluid and the main body.

Apart from the advantage of the simple handling for the cleaning and for the reassembly after the cleaning has been effected, the approach also has the advantage of an efficient manufacturability.

In alternative embodiments, the docking element body can also be designed as one piece, as the case may be with softer insert parts for possibly required separate valves.

In the assembled condition of the drinks preparation system, the docking element can run between the drinks preparation machine and a main part of the milk frother appliance, and specifically above the drinks outlet. An end surface of the docking element, for example, can be essentially vertical for being brought into contact with a corresponding portion of the drinks preparation machine. The docking element can have an essentially cylindrical shape with a horizontal cylinder axis perpendicular to an end surface and with an arbitrary, for example essentially rectangular, cross section.

The milk frother appliance, for example, includes a mixing nozzle, in which the steam is brought together with the milk and, for the preparation of warm frothed milk for example, also with air. In embodiments, the mixing nozzle can be arranged in the docking element. In particular, the mixing nozzle can be arranged directly above the milk froth outlet, i.e. the frothed milk gets into the milk froth outlet directly from the mixing nozzle.

The milk froth outlet can form a milk froth outlet chamber that tapers downwards. The milk froth of the frothed milk is further homogenised and channelised in such a chamber.

In embodiments, the flow of the steam—which gets into the mixing nozzle from the steam connection—effects the sucking of air and the intermixing with milk fed to the mixing nozzle, in a manner known per se, by which means frothed milk can be produced, and this milk is warm on account of the heat released by the steam, wherein this heat is predominantly, but not exclusively released to the milk as condensation heat. This suction effect can be based on Bernoulli's law (wherein the mixing nozzle can be then be designed for example as a Venturi nozzle) and/or on impulse transmission, as is known per se in combination with so-called jet pumps.

The electrical current that is supplied via the interface serves for the drive of an active element of the milk frother appliance, in particular of a pump, and in particular of a pump as part of a milk frothing unit for the preparation also of cold milk froth.

In particular, the milk frother appliance can include a gear pump. The gear pump at an inlet side is connected to a milk feed conduit and to an air feed, for the purpose of preparing frothed milk.

The milk frothing unit can optionally be designed such that an operating parameter is adjusted in a manner depending on a measured value and/or operator input. What is meant by "adjusting" here is exerting an influence upon the at least one operating parameter of the milk frothing unit that influences how this unit acts during an active milk frothing operation. The adjustability therefore is different to a mere "on/off", as is known from the state of the art. The adjustability in particular is effected such that a parameter, which is specified by the user and/or specified by a control, has an influence on the characteristics and/or quantity of the produced milk froth. In particular, an adjustable operating parameter can be a speed of the gear pump or the fed air quantity (which can be regulated, for example, by a valve unit with an adjustable valve opening).

Additionally to the mentioned connection for the steam, the docking element can include a further connection for water that is hot, for example, and/or for steam, which is/are delivered by the drinks preparation machine, the water or the steam being able to be used for through-rinsing and for cleaning. A conduit traversing the docking element can be present coming from this connection for the cleaning water or for the cleaning steam. This conduit, for example, runs out into the milk frothing unit, and as the case may be likewise serves for through-rinsing and, under certain circumstances also for sterilising the gear pump including the feed conduits and outgoing conduits.

In embodiments, the drinks preparation machine can also include an air delivery location, through which air can be delivered to the milk frother appliance, for example to its gear pump as the case may be, in a regulated manner. In such embodiments, the docking element can additionally include an air feed-through for the air that comes from the drinks preparation machine and which is to be delivered to the milk frothing unit.

A drinks preparation machine, in particular a coffee machine of a drinks preparation system of the type described here, can be designed as a machine of the type often called "capsule machine", with a brewing chamber for inserting a portion capsule with an extraction material and for brewing a hot drink (coffee or possibly tea or another hot drink) from this extraction material and water. However, it can also be designed, for example, as a bean-to-cup coffee machine with a mill mechanism or as a piston machine for receiving coffee powder.

The drinks preparation machine for example includes a water container, a water pump and a water heater. A brewing chamber for preparing the hot drink from heated water by way of extraction from an extraction material is also present.

The drinks preparation machine is designed such that the milk frother appliance can be docked onto it, by way of a steam delivery location and a machine-side electrical interface being present and being arranged relatively close to one another and such that the docking element can be docked by way of a single predefined movement or a movement procedure (without parts which are moved relative to one another). Depending on the design of the milk frother appliance, the drinks preparation machine can moreover include an air delivery location of the previously mentioned type, which is connected to the machine's internal valve unit, the unit in particular being electronically controlled.

The docking location with the steam delivery location and with the machine-side electrical interface (and air delivery location as the case may be) in particular can be present in the direct proximity of the drinks outlet. A distance between the drinks outlet and an end surface of the docking location, on which surface the respective end surface of the docked docking element abuts, can, for example, likewise be maximal 2.5 cm, maximal 2 cm or maximal 1.5 cm.

A drinks preparation machine often has a front with a placement platform that projects from the front and is for drinks vessel, and above this, likewise projecting from the front, with a drinks outlet hood, on whose lower side the drinks outlet is arranged. In embodiments, the docking location is then present laterally on the drinks outlet hood. This, for example, means that the milk frother appliance is coupled onto the drink outlet hood from the side.

At least the docking element and, for example, the complete milk frother appliance is then arranged in front of the front of the drinks preparation machine, in the coupled-on condition.

A drinks preparation system includes a milk frother appliance as well as a drinks preparation machine. The two appliances with regard to their dimensioning are matched to one another such that the milk frother appliance is either placed on the same level as the machine, or on a milk frother platform formed by the machine.

Moreover, the milk frother appliance as well as the drinks preparation machine can be matched to one another with regard to their fashioning.

BRIEF DESCRIPTION OF THE DRAWINGS

Embodiment examples of the invention are hereinafter described by way of figures. The same or analogous elements are indicated in the figures by the same reference numerals. There are shown in:

FIG. 1 is a view of the appliance for preparing frothed milk (milk frother appliance);

FIG. 2 is an exploded representation of the milk frother appliance;

FIG. 3 is an exploded representation of the milk frothing unit of the milk frother appliance;

FIG. 4 is a view of the milk frothing unit sectioned along a horizontal plane;

FIG. 5 is a partial view of the seal of the milk frothing unit with elements of the gear pump;

FIG. 6 is a view of the upper main housing part of the milk frothing unit, which is sectioned along a horizontal plane;

FIG. 7 is a view of the upper main housing part from below;

FIG. 8 is a view of the upper main housing part, which is sectioned along a vertical plane;

FIG. 9 is a view of the valve unit of the milk frothing unit;

FIG. 10 is an exploded representation of the valve unit;

FIG. 11a-11c show the valve unit in a plan view, side elevation and front elevation, respectively;

FIG. 16a-16b are views of the main body;

FIG. 17a-17d are representations of the docking element without an external housing;

DETAILED DESCRIPTION OF THE INVENTION

Figure 12:
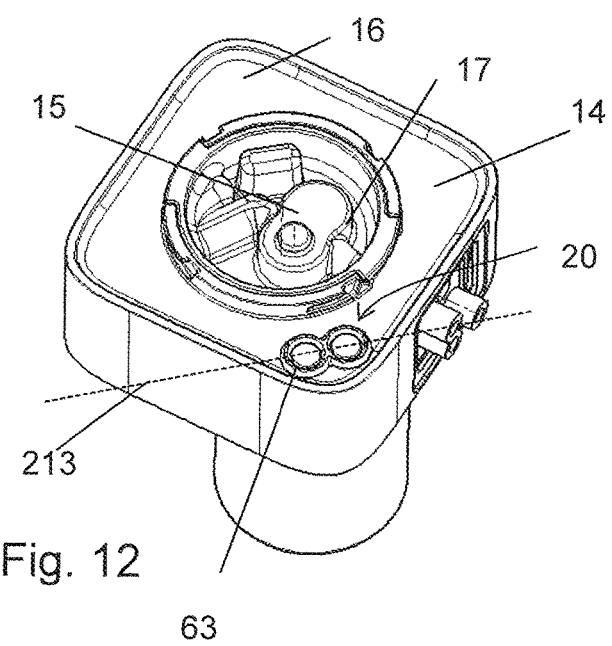
FIG. 12 is a view of the milk frothing unit with a valve unit, from above.

The appliance 1 for preparing frothed milk (milk frother appliance) is represented as a whole in FIG. 1. FIG. 2 shows an exploded representation of its parts.

The appliance 1 includes a milk container 3, a milk frothing unit 5 and a lid 6.

The milk container 3 is designed in a doubled walled manner in the represented embodiment, for thermal insulation purposes, but single-walled designs are also possible. It can be transparent or include a viewing window for checking the level of the milk.

The milk container 3 and lid 6 can be matched to one another such that the lid 6 can also be placed directly onto the milk container 3, without the milk frothing unit 5 being arranged therebetween, by which means the filled milk container with the lid can be placed into the fridge for example. The milk container and the lid can also be cleaned in a simple manner, and be designed, for example, in a dishwasher-safe manner.

The elements of the milk frothing unit 5 are represented in an exploded representation in FIG. 3. A lower main housing part 11 carries an electric motor 13 belonging to the gear pump, as well as an upper main housing part 14. A lateral window 12 is formed in the upper main housing part.

The upper main housing part 14 forms a roughly circularly cylindrical trough, in which gears 17 of a gear pump are arranged. The gears 17 of the gear pump are driven via a shaft 19, which is connected to the electric motor 13. A seal 21 seals the trough to the bottom.

Additionally to the gears, the shaft and the electric motor, the gear pump can also have its own housing, or such can be integrated into the main housing or other parts, for example into a milk frothing unit cover 16. In the represented embodiment example, the milk frothing unit cover 16 is shaped out such that a pump chamber encompassing the gears 17 is formed between the seal 21 and the milk frothing unit cover 16, on account of an arching 15 (also clearly visible in FIG. 12).

A valve unit 20 is also fastened on the main housing 11, 14.

A milk suction tube 18 (not represented in FIG. 3) extends downwards from the plane of the gear pump and projects into the milk container 3 and almost up to the base of this, in the assembled condition of the appliance 1.

A connection shaped part 22 is further present beneath the gear pump. This part seals the window 12 and simultaneously forms a feed-through for connection of conduits of the milk frother, which are described hereinafter and are fastened, on the one hand, to the main housing and, on the other hand, to a docking element.

Likewise visible in FIG. 3 are a spacer 23 and a motor seal element 24.

The docking element includes a docking element body, which is protected by a docking element housing 26. The docking element body is formed by a main body 25 and a supplementary part 27, which is described in yet more detail hereinafter. It can already be seen in FIG. 3 that the supplementary part 27 includes a downwardly projecting milk froth outlet 28.

FIG. 4 shows a view from above, of the milk frothing unit 5, which is sectioned along a plane lying above the sealing plane defined by the seal 21. The lighter lines in the plan view represent elements running further below, which per se are not visible.

The gear pump is attached above the sealing plane. An upper-side liquid conduit 31 leads to the gear pump. This is connected on the one hand to the milk suction tube 18 and on the other hand to a hot water conduit and/or steam feed conduit 32, via duckbill valves 42, 41, which are formed by the seal 21 and are also clearly visible in FIG. 5. An air feed conduit 34 is connected to the upper-side liquid conduit, which is to say to the gear pump at the inlet side, likewise via a duckbill valve 43, which is formed by the seal.

Arranged behind the gear pump is a feed-through 36 for the delivered milk, which is already frothed, depending on the selected operating condition, through which feed-through this milk again goes downwards through the sealing plane, where it gets through an outgoing conduit 35 into the docking element.

FIGS. 6 to 8 show further views of the upper main housing part 14, which in represented sectioned along a horizontal plane in FIG. 6 and along a vertical plane in FIG. 8 and in a view from below in FIG. 7.

The lower-side conduits are formed by tubes of the connection shaped part 22, which are laid into corresponding channels of the upper main housing part 14. These channels, i.e. the channel 51 for the hot water and/or steam feed conduit 32, the channel 52 for the air feed conduit 34 and the channel 53 for the outgoing conduit 35 are particularly clearly visible in the view from below according to FIG. 7.

The seal 21 (FIG. 8) is clamped between the upper main housing part 14 and the milk frothing unit cover (not shown in FIG. 8). The pump chamber of the gear pump including the gears 17 is formed between the milk frothing unit cover and the upper main housing part, due to the arching 15 in the milk frothing unit cover (FIG. 3; FIG. 12).

A further optional feature can be seen in FIG. 8. The feed-through 36 for the delivered milk that is already frothed depending on the selected operating condition is narrowed in the manner of a throttle. A certain backpressure is produced in the gear pump by way of this, on account of which pressure the flow quantity regulates itself. This backpressure contributes to an efficient frothing of the cold milk.

FIG. 9 shows a view of the valve element 20, FIG. 10 shows an exploded representation of the valve unit and FIGS. 11a-11c show the valve unit in a view from above, sectioned along the line E-E in FIG. 11a and along the line D-D in FIG. 11a.

Figure 13:
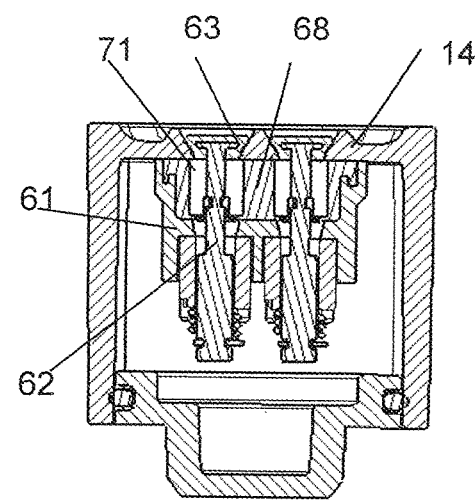
FIG. 13 is a representation of the milk frothing unit, sectioned along a plane through the valve unit.

FIG. 12 shows a view of the milk frothing unit with a valve unit 20, without the docking element and milk suction tube, from above, and FIG. 13 shows this sectioned along a vertical plane going through the line 213 in FIG. 12.

The valve unit 20 includes two valve elements in a common valve housing 61. Each valve element includes a closure element 62 that carries a sealing element 63 and is movable along an axis—in the selected installation situation—along the vertical axis. The upward movement is effected by way of an electromagnet 64 and against the force of a spring 65 stressed between the electromagnet (or the valve housing) and a securing ring 66. The heads of the valve elements, which are formed at the upper side by the closure elements and seal elements, project through openings in the upper main housing part 14 (see FIGS. 12 and 13). In the closed condition, a seal portion 67 of the respective seal element 63 is pressed by the force of the spring against a surface of the upper main housing part 14, along the periphery of the respective opening.

With both valves, a valve chamber 71 forms in each case between the respective wall of the upper main housing part 14 and a seal 68. An inflow opening forms when the closure element with the sealing element 63 is lifted by the electromagnet, through which inflow opening air can flow from the outside into the respective valve chamber 71 and from this can get into a (common) air feed conduit through an air connection stub or branch 73.

The two valve elements can be actuated independently of one another and can be opened in each case individually or together. Different valve opening conditions can be created by way of this. As a whole, four valve opening conditions result by way of either only one of the valve elements being open and the other closed, both being open or both being closed.

In embodiments, it can also be meaningful for the valve elements and/or the size of the respectively formed inflow opening to be selected to a differently large extent and/or for the air, which is admitted by one of the valve elements, to be subjected to a significantly greater flow resistance than the air admitted by the other valve element. The four different defined opening conditions are then quantitatively different.

For example, the inflow opening of one of the valve elements can be double the size of the inflow opening of the other valve element, so that the conditions "0" (air valve completely closed), "⅓" (the smaller valve element open), "⅔" (the larger valve element open) and "1" (both valve elements open) can be selected.

An airflow regulating element such a 3/2-way valve for example (not drawn) and by way of which the path between the valve chambers 71 and the mixing nozzle or the path between the valve chambers and the entry of the gear pump can be opened and the respective other path can be closed, can be arranged in a manner connected downstream of the valve unit in the airflow direction, in order to regulate whether the mixing nozzle or the gear pump is to be fed with air. Such an airflow regulating element, however, can also be done away with, wherein the regulation is then effected automatically by the respective valve elements, by way of these only opening due to a vacuum at the outlet side, and in this manner preventing a backflow of frothed milk into the respective path, which is not required.

Figure 14A:
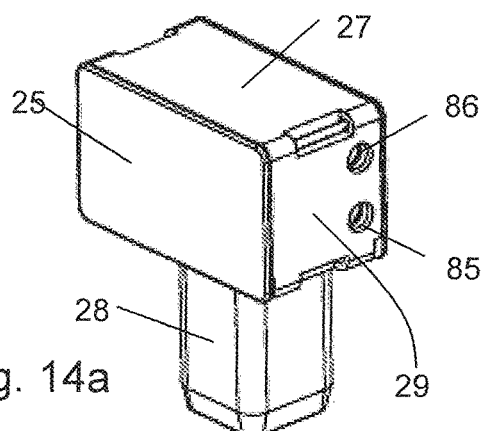
FIG. 14a-14b are views of the docking element, obliquely from above and below, respectively.
Figure 14B:
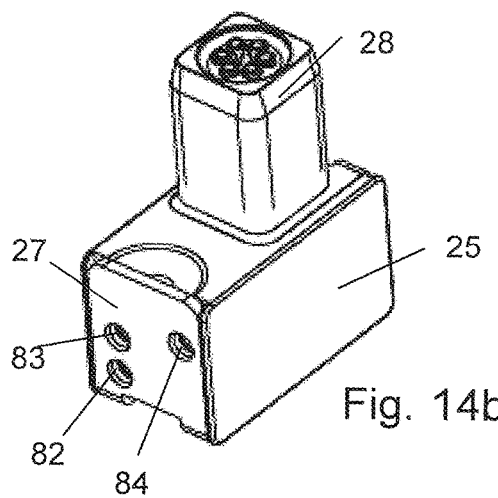
Figure 15A:
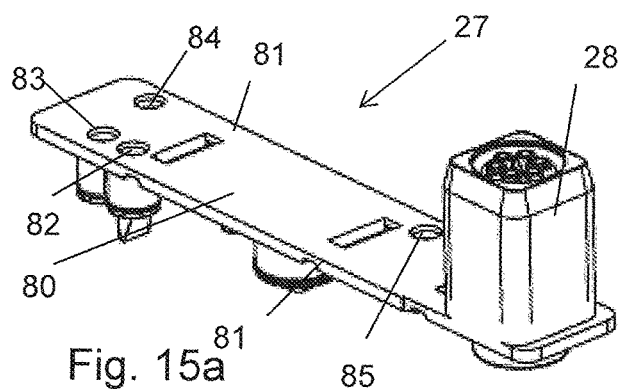
FIG. 15a-15d are views of the supplementary part.
Figure 18A:
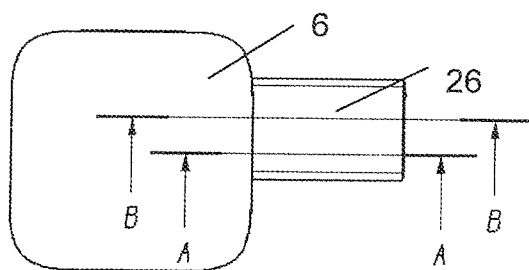
FIG. 18a-18c are representations of parts of the appliance, from which the function of the docking element is evident.
Figure 18B:
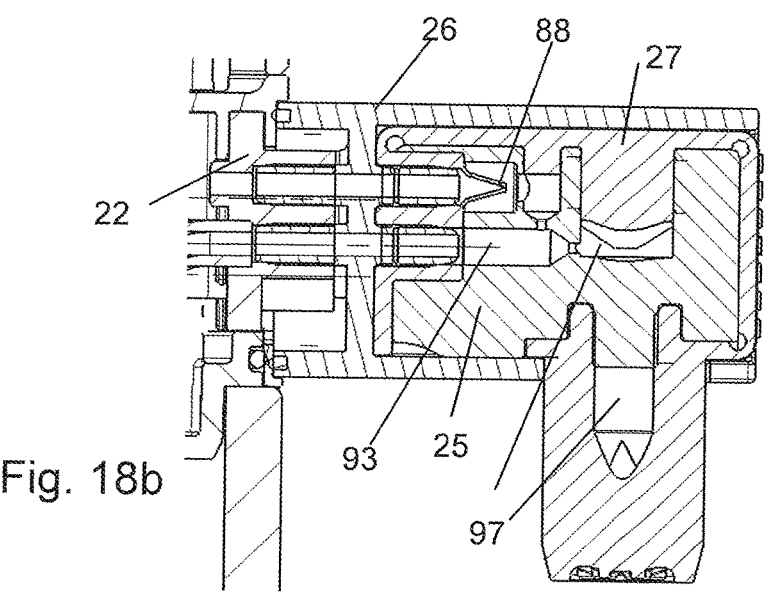
Figure 18C:
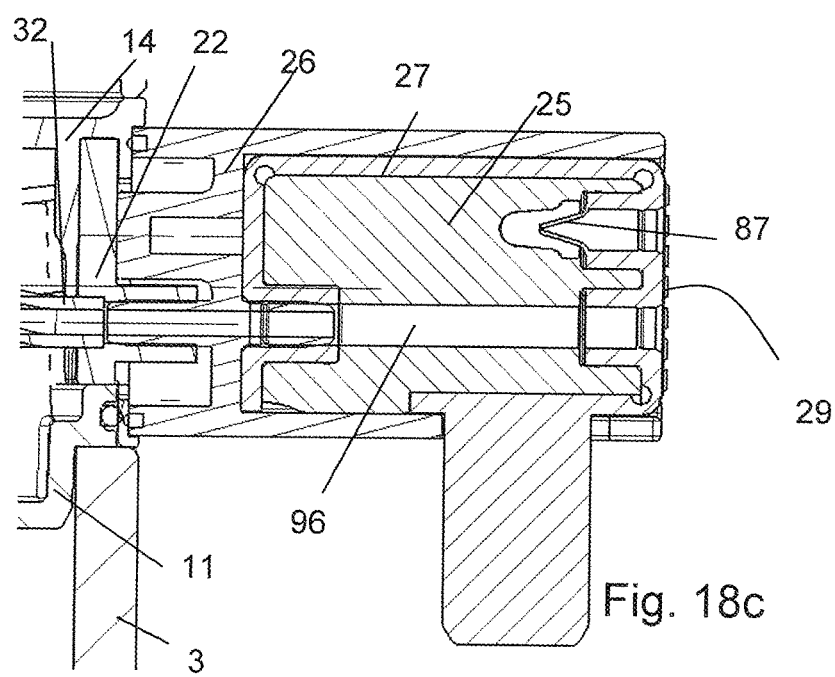

The construction and manner of action of the docking element are described hereinafter by way of FIGS. 14a-14c. FIGS. 14a and 14b show views of the docking element obliquely from above and obliquely from below respectively. FIGS. 15a and 15b show the supplementary part 27 in an unfolded condition and FIGS. 15c and 15d in a folded condition. FIGS. 16a and 16b show the main body 25. FIGS. 17a, 17b and 17c show the docking element sectioned along the planes A-A, B-B and C-C in FIG. 17d. FIG. 18a shows a view of the appliance from above, and FIGS. 18b and 18c show sections of sectioned representations of the appliance sectioned along the planes A-A and B-B in FIG. 18a, respectively.

Figure 15C:
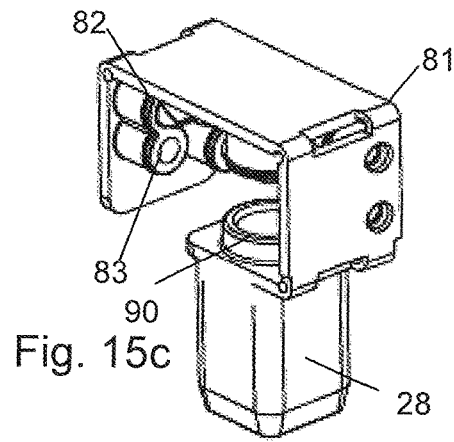
Figure 15B:
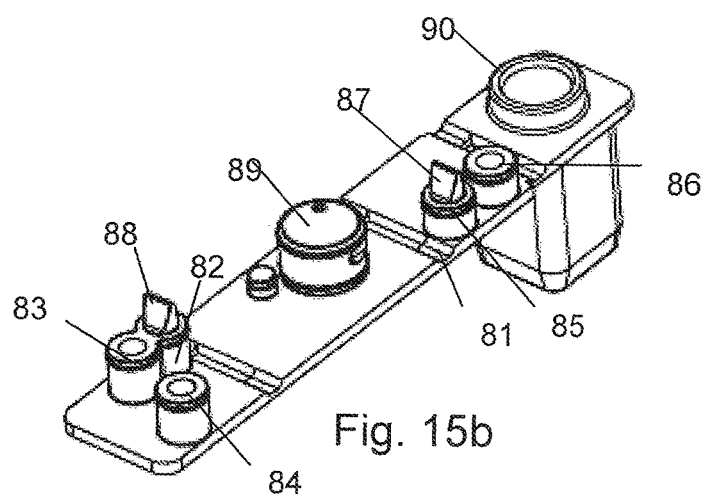
Figure 15D:
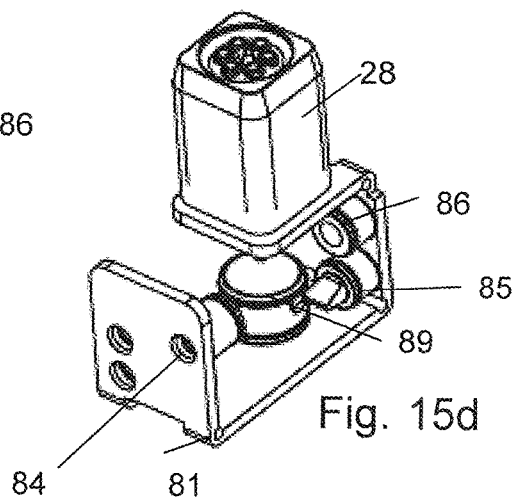

The face-side end which, for example, lies at the front in FIGS. 14a and 15c is coupled onto the coffee machined on operation, whereas the opposite end can be coupled onto the milk frothing unit 5.

The main body 25 as a whole can be designed as a shaped body of a suitable, heat-resistant plastic and be manufactured for example as an injection moulded part. The supplementary part 27 is manufactured from silicone, for example. It is of one piece and as a whole is designed in an extensive (sheet-like) manner with functional elements that are integrally formed thereon. The entirety of the extensive sections is here indicated as a "base". Joints 81, which are formed by continuous openings, as well as groove-like recesses and which permit an unconstrained folding around the main body 25 are formed between the extensive sections 80. The dimensions of the extensive sections 80 between the grooves are matched to the dimensions of the main body.

Apart from the milk froth outlet 28, the functional elements of the supplementary part 27 are formed by feed-throughs 82-86, and a mixing nozzle element 89.

The main body 25 forms a feed-through conduit 96, which passes from the end at the coffee machine side to the opposite end and which is for cleaning water (cold or heated by the coffee machine) or cleaning steam, the water or steam when required going from the feed-through conduit 96 into the hot water and/or steam feed conduit 32 and from this into the elements to be cleaned, in particular the gear pump. A feed-through 86, 84 of the supplementary part is assigned to the feed-through conduit 96 in each case at the coffee machine side and the milk frother side.

A steam connection, through which steam gets from the coffee machine into the mixing nozzle, is also formed. The steam connection is formed by a feed-through 85 with an assigned valve 87 of the supplementary part 27, the feed-through projecting into a steam connection opening 95 of the main body 25.

On the milk frother side, an opening 92, 93 for the supply of air and milk and into which corresponding feed-throughs 82, 83 of the supplementary part project are formed in the main body in each case. The air feed-through 82 is provided with an assigned valve 88, and this is designed as a duckbill valve just as the steam valve 87 and is of one piece with the remainder of the supplementary part 27.

For the mixing nozzle, the main body 25 includes a mixing nozzle opening 99, into which the mixing nozzle element 89 projects. A milk froth outlet continuation 91 and a positioning ring 94 surrounding this are moreover formed on the underside and cooperate with a corresponding structure 90 of the supplementary part.

The mixing nozzle is formed between the mixing nozzle element and correspondingly shaped chambers of the main body 25.

Steam which is fed in via the steam connection, via the valve 87 gets into a mixing nozzle chamber 97, which one can see particularly well in FIG. 17c for example. A vacuum is produced in the mixing nozzle chamber 97 by way of the flow of steam, by way of which vacuum air and milk is sucked via the respective feed-throughs 82, 83 (FIG. 17b, FIG. 18b). Milk froth arises in the mixing nozzle chamber, and goes downwards through the milk froth outlet 28 and into a ready-and-waiting drinks vessel. The frothed milk is warm due to the condensation heat released by the steam.

On account of the small nozzle opening, through which the steam exits at a high speed, the mixing nozzle is thus designed such that a vacuum is produced due to the nozzle effect. This also assists the transport of milk out of the milk conduit, even if the milk is actively delivered due to the gear pump.

The duckbill valves 87, 88 are closed if normal pressure or a slight overpressure prevails in the inside of the mixing nozzle chamber 97. However, they both automatically open if in contrast—as soon as steam flows in—a vacuum prevails on account of the Bernoulli effect and/or on account of impulse transmission.

The feed of air into the mixing nozzle chamber can also be effected directly from the outside, for example via a duckbill valve, instead of through the valve unit, wherein two air paths that are independent of one another then result, on the one hand for the mixing nozzle chamber and on the other hand for the gear pump.

Such a design with the feed of air directly into the mixing nozzle chamber can also be selected for embodiments for example, with which, differing from the example described here, no electrically operated drive device (no electrically operated pump) is present and with which one froths merely in a steam-assisted manner, whilst utilising the suction effect of the mixing nozzle.

The docking element is designed such that the milk froth outlet 28 can lie closely to the outlet for the hot drink. For this purpose, it is arranged in the direct proximity of the end surface 29 coupled to a corresponding surface of the drinks preparation machine. As discussed previously, the distance is not more than 2.5 cm and is preferably even less. The distance as usual is measured as the distance measured perpendicularly to the (vertical) plane defined by the end surface, between this plane and the centre point of the exit opening out of the milk froth outlet.

A further optional feature is particularly clearly evident in FIG. 17c. The outlet chamber 86, through which the—generally frothed—milk runs downwards, tapers in the milk froth outlet 28. This on the one hand has an additional froth-forming and froth-homogenising effect and on the other hand channelises the flow of milk or milk froth.

Figure 19:
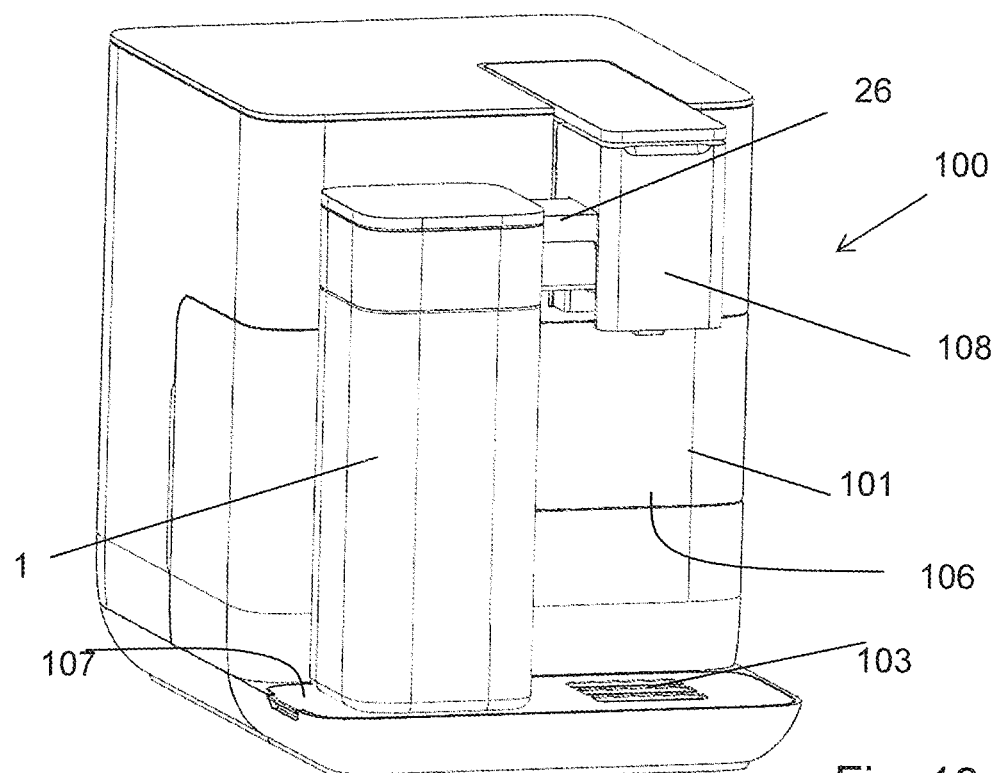
FIG. 19 is a view of the drinks preparation system with the milk frothing appliance.
Figure 20:
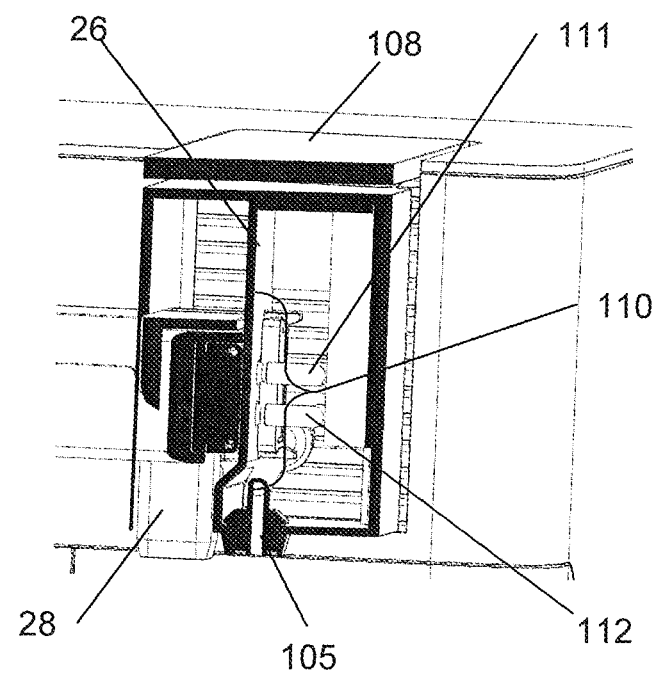
FIG. 20 is a detail of the drinks preparation system, represented sectioned along a vertical plane.

FIG. 19 shows a view of the complete drinks preparation system 100 with the milk frothing appliance 1 and a coffee machine 101, onto which the milk frothing appliance 1 is coupled. FIG. 20 shows a detail concerning this appliance, with the outlet hood represented in a sectioned manner.

The coffee machine, as is known per se for coffee machines, includes a water container, a water pump and a water heater. A brewing chamber for preparing coffee from heated water by way of extraction from coffee power is moreover present, the coffer powder being provided, for example, in portion capsules which were previously inserted into the coffee machine before the preparation. As an alternative to a portion capsule system, the coffee machine can also be designed as a so called bean-to-cup coffee machine, which also includes a coffee mill and grinds the coffee powder in a portioned manner and feeds it to the brewing chamber. As yet a further alternative, particularly if the coffee machine is designed as a piston machine, i.e. the brewing chamber is formed between a fixed part and a removable piston, one can yet also envisage the coffee power being brought into the brewing chamber by the user in a manner in which it is already in the ground, but loose (non-compacted) condition.

The coffee machine can further include a capture container for spent coffee powder portions (in capsules or in a loose manner, depending on the design of the coffee machine).

A placement platform 103 for placing a drinks vessel or cup is formed on the coffee machine. This can be formed for example by way of a grating, below which a capture dish is located. In embodiments, the placement platform can be height-adjustable in a suitable manner.

A coffee outlet 105, through which brewed coffee runs out and gets into the cup or vessel lying therebelow, is located above the placement platform 103. This outlet is located below an outlet hood 108 that forms part of the coffee machine housing and at least partly covers the outlet to the front and to the sides.

The coffee machine 101 forms a front 106, from which, as is known per se from other coffee machines, on the one hand the placement platform 103 projects and, on the other hand, above this, the outlet hood 108 projects.

Here, a milk frother platform 107, onto which the docked milk frothing appliance 1 is placed, likewise projects from the front.

A connection location 110 for the connection of the docking element onto the coffee machine is located in the proximity of the coffee outlet 105 and here, below the outlet hood. This connection location includes a steam delivery location 111 for coupling onto the steam connection of the docking element, and a hot water and/or steam delivery location 112 for coupling onto the feed-through conduit 83. The steam delivery location 111 and the hot water and/or steam delivery location 112 when required are respectively supplied with steam and hot water from the water heater, wherein a multi-way valve in the inside of the coffee machine can selectively feed heated liquid or steam to the brewing module, the steam delivery location or the hot water and/or steam delivery location 112.

Figure 21:
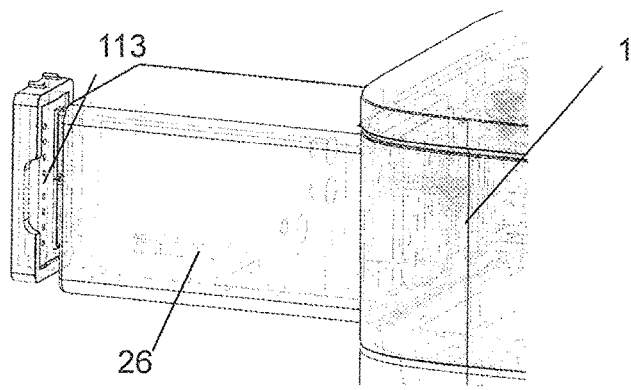
FIG. 21 is a detail concerning the docking of milk frothing appliance onto the drinks preparation machine.

The connection location further preferably includes electrical contacts 113, which are represented schematically in FIG. 21. These electrical contacts 113 form an interface on the drinks preparation machine side, and, given a coupled-on docking element, create an electrical connection to corresponding electrical connection element contacts, which are connected to electrical leads leading through the docking element or are formed by these. These electrical leads supply the electrically driven elements of the milk frother appliance, specifically the gear pump, with electricity and control signals as the case may be.

Thereby, it is possible to provide a control of these electrically driven elements in the milk frother appliance (this appliance is then provided with the necessary electronic units and receives control signals from the coffee machine or from an input unit of the milk frother appliance) as well as to accommodate a control of these elements in the coffee machine itself. In the latter case, it is essentially only currents driving the electrically driven elements in accordance with the settings of the control, which are led through the electrical leads.

The docking of the milk frother appliance 1 is effected from the side onto the outlet hood 108, and specifically such that the milk frother appliance as a whole is arranged in front of the coffee machine and laterally of the outlet hood 108. The docking is effected, for example, by way of a simple, linear, lateral movement of the assembled milk frother appliance along the front 106.

Figure 22:
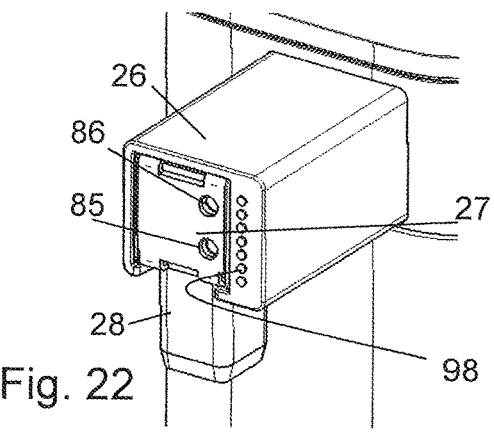
FIG. 22 is a view of a detail of the milk frother appliance.

As one can see in FIG. 21 (showing the milk frother appliance 1 in a decoupled condition) and in particular in FIG. 22 (milk frother appliance without a coffee machine), the electrical leads and the corresponding contacts 98 on the docking element side are formed on the docking element housing 26. The leads can be formed by way of insulated wires or strand conductors or by way of strip conductors of printed circuit (circuit board or flexprint) or the like.

The control of the gear pump in particular is configured such that the speed of the gears 17 can be adjusted, i.e. is selectable. By way of this, the user can control the delivery speed and—according the procedure which is described in more detail hereafter—as the case may be the preparation of cold frothed milk.

Figure 23:
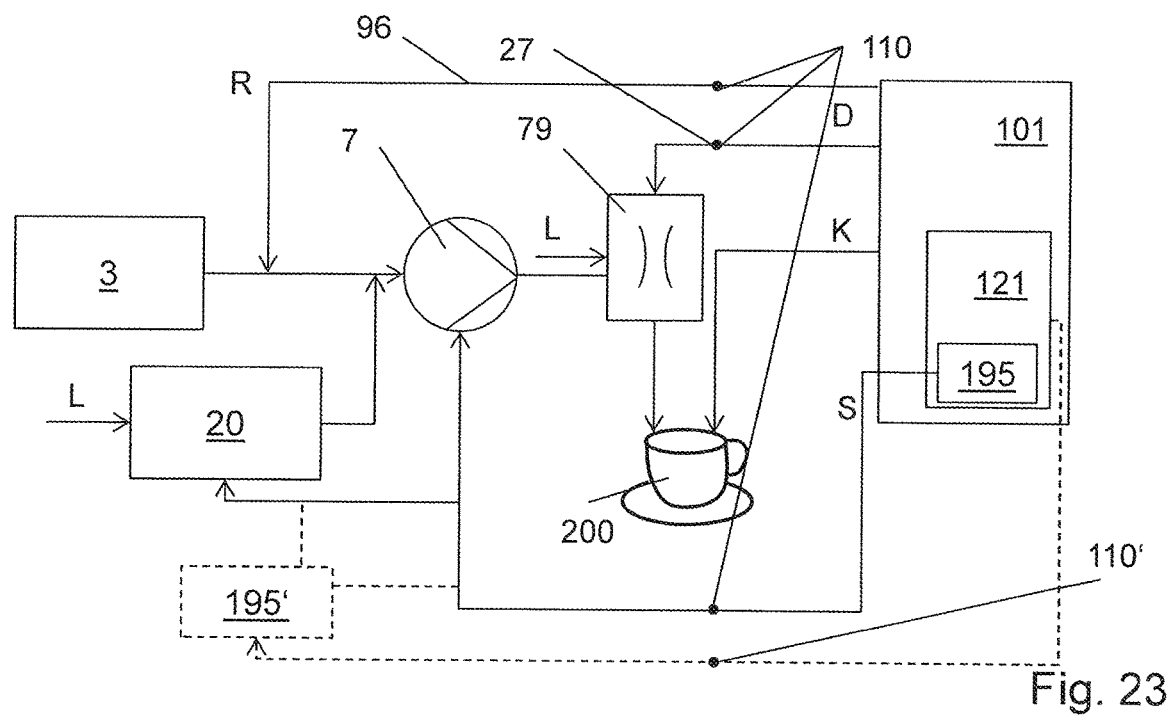
FIG. 23 is a schematic diagram of the drinks preparation system.

FIG. 23 shows an overview diagram of the milk frother appliance and its coupling onto the drinks preparation machine (coffee machine 101). Air feeds are indicated as "L" in the figure. The letter D indicates a conduit for steam, K a conduit for the hot drink, R a conduit for cleaning water or steam (optional) and S indicates the electricity supply.

The activation 195 here is represented as part of an electronics unit 121 of the coffee machine 101. The electronics unit 121 is configured, for example, to recognise a capsule by way of a measurement and/or to accept a user input, for example via a suitable operating element with a corresponding button, with a touchscreen and/or the like.

Here, the activation 195 is designed such that it can activate the gear pump 7 as well as the valve unit 20, wherein an operating parameter of the gear and/or of the valve unit can be regulated (closed-loop controlled). Activation signals for the valve unit 20 and/or for the gear pump 7 run directly via the connection location 110.

An activation 195' can also be present completely or partly as part of the milk frother appliance, alternatively to incorporating the activation completely or partly in the coffee machine. This alternative is represented in FIG. 20 in a dashed manner. The electrical energy and, as the case may be, data signals can then be transmitted from the electronics unit to the activation 195' via the alternative interface 110'.

The mixing nozzle is indicated as a whole by the reference numeral 79.

The milk frother appliance can be operated as described hereinafter.

The gear pump is set in motion whilst at least one of the valve elements of the valve unit 20 is open, for the preparation of cold frothed milk. A vacuum is produced at the inlet side of the gear pump due to the effect of this pump, and this vacuum draws or sucks milk through the milk suction tube 18 and the corresponding duckbill valve 42, as well as air through the valve unit 20 and the corresponding duckbill valve 43. Milk froth therefore arises in the gear pump and gets through the feed-through 36—whose narrowness encourages the formation of fine-pored froth—, the outgoing conduit and the docking element 25, to the milk froth outlet 28 and is dispensed there, wherein generally is drinks vessel 200 is placed upon the platform 103.

The drawing or sucking of the generally cold milk out of the milk container 3 via the gear pump is also effected for the preparation of warm frothed milk. This gear pump delivers the milk into the mixing nozzle. Steam from the coffee machine is simultaneously fed to this nozzle via the steam connection. As has already been explained above, the steam produces a vacuum, which, on the one hand, exerts an additional suction upon the milk and assists in the delivery through the gear pump and, on the other hand, sucks air through the likewise at least partly open valve element 20. In the mixing nozzle chamber 97, the milk is mixed with the steam, which heats it up and air is simultaneously intermixed, so that small air bubbles form and milk froth arises. The warm, frothed milk is dispensed through the milk froth outlet.

As mentioned and depending on the situation, a 3/2-way valve or another means can selectively connect the valve element 20 to the gear pump 7 or to the mixing nozzle chamber 97, for the production of cold and warm milk froth respectively. As mentioned, it is also possible for the air feed into the mixing nozzle chamber not to be effected via the valve element 20 but in a direct manner, in which case the supply of air cannot then be regulated by way of a separate means when producing warm milk froth.

One can also envisage the user also only being able to deliver cold milk. In this case, the gear pump is driven, but the valve elements remain closed, and also no steam is fed.

One can also envisage the user being able to prepare warm milk. In this case, the valve element, through which air can get into the mixing chamber, is closed. Should a separate valve for the mixing nozzle chamber be provided (differing from the embodiment represented in the figures), then there is also the possibility of designing the respective valve in a closable manner. A closure of the valve can also be envisaged mechanically by the user by hand for example. For preparing warm milk, the milk is delivered out of the milk container 3 by way of the gear pump, and steam is simultaneously fed in the mixing nozzle 79, without air also being fed. Warm milk arises due to the mixing of the cold milk with the steam, and this is then dispensed via the milk froth outlet 28.

For on-the-spot cleaning, a vessel is placed below the milk froth outlet 28, and warm water or steam is fed through the feed-through conduit 96 and the hot water and/or steam feed conduit 32. The gear pump is simultaneously set in motion.

The milk frother appliance, however, is also very simple to clean after it has been removed. The milk container 3 and the lid 6 can be designed in a dishwasher-safe manner without any problems. The milk frothing unit 5 can likewise be simple taken part and cleaned, wherein it is quite useful for the seal 21 to be designed as one piece with the duckbill valves 41, 42, 43 and for it to terminate with the surface of the upper main housing part 14 in a flush manner.

Finally, the docking element is simple to clean due to the fact that the parts that come into contact with milk (main body 25, supplementary part 27) can be simply dismantled, designed in a dishwasher-safe manner and also be simple assembled again in only a single—correct—configuration.

Figure 24:
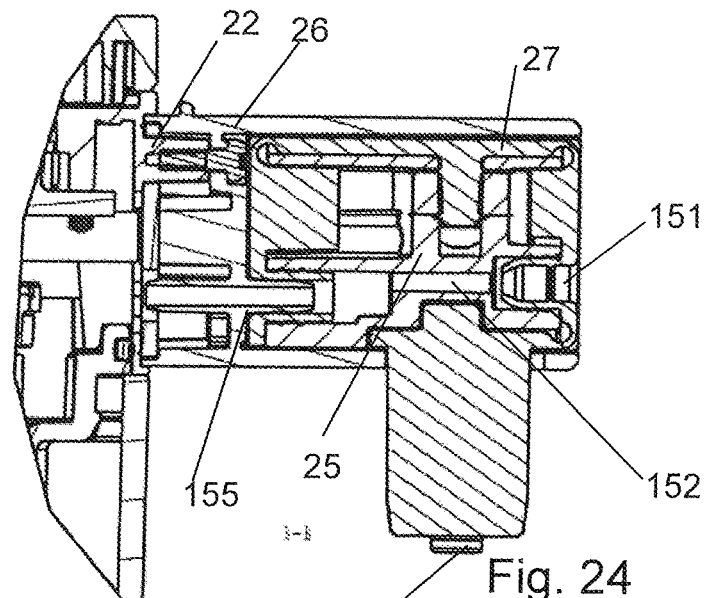
FIG. 24 is a sectioned representation of the milk frother appliance which is drawn only partly, with the docking element, in an alternative embodiment.
Figure 25:
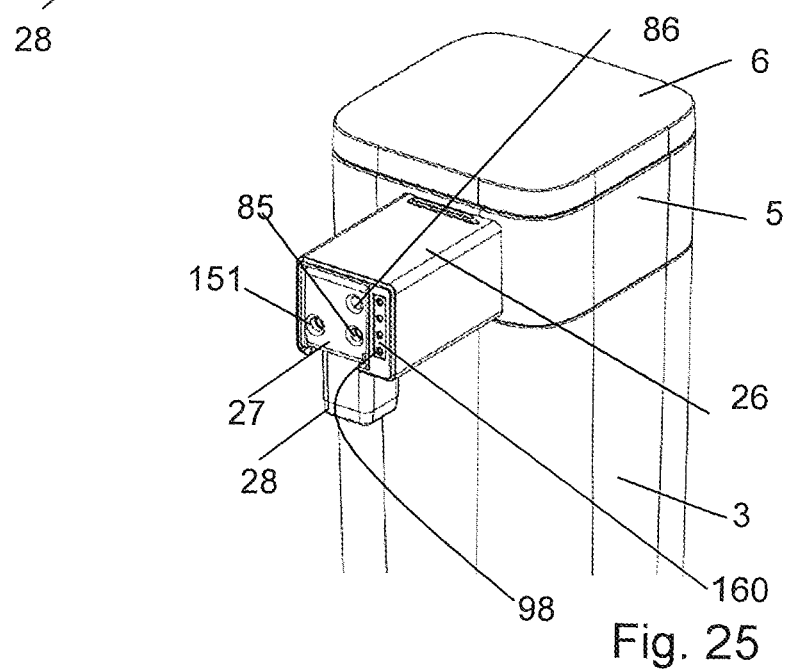
FIG. 25 is a view of this milk frother appliance in the alternative embodiment.

FIGS. 24 and 25 represent an alternative embodiment. This differs from the embodiment described above, in that the supply of air towards the air feed of the gear pump—thus, for example, to an air feed conduit 34, for example of the described type, or directly to the pump chamber—is not effected by a valve unit belonging to the milk frother appliance, but in a manner coming from the drinks preparation machine. The drinks preparation machine includes for example an electronically regulated valve unit for this purpose. This valve unit can be based essentially on the same functioning principle as the valve unit of the milk frother appliance which is described above. It can alternately have a different functioning principle, for example by way of it only including one valve unit.

For this purpose, the docking element includes an air connection 151 towards the drinks preparation machine. Air gets through an air feed-through 152, which here horizontally passes through the docking element, into the milk frothing unit. In the represented embodiment example, a section of the air feed-through is formed by a tube portion 155 of the docking element housing 26, which however is not a necessity (concerning the air feed-through, a regular cleaning is not a necessity, in contrast to conduits, through which milk flows).

The possibility of the electrical contacts being able to be formed by a contact module 160 is yet indicated in FIG. 25, wherein this module, for example, can include a circuit board or the like and be insertable into a suitable recess in the docking element housing 26.

The valve unit arranged in the milk frothing unit is done away with in the embodiment according to FIGS. 24 and 25.

Many further variants are conceivable. Apart from the options which have already been discussed, there is also the possibility of keeping the conduits for cold milk froth (from the pump) and for warm milk froth (created in the mixing nozzle) separate from one another up to the outlet, i.e. the cold milk froth is then not led through the mixing nozzle. The milk froth outlet can then include openings that are separate from one another, for example concentric to one another, for the cold and the warm milk froth. Milk froth outlets for the cold and the warm milk froth and that are completely separate from one another are also conceivable, and the optional conditions for the maximal distance between the milk froth outlet and the hot drinks outlet, which are discussed above, apply in this case, for example, for the discharge of the warm milk froth, since it is often this milk froth, which is mixed with the hot drink.

LIST OF REFERENCE NUMERALS 1 milk frother appliance
3 milk container
5 milk frothing unit
6 lid
7 gear pump
11 lower main housing part
12 window
13 electric motor
14 upper main housing part
15 arching (in the milk frothing unit cover)
16 milk frothing unit cover
17 gears 18 milk suction tube
19 shaft
20 valve unit
21 seal
22 connection shaped part
23 spacer
24 motor seal element
25 main body (of the docking element)
26 docking element housing
27 supplementary part
28 milk froth outlet
29 end surface
31 liquid conduit
32 hot water and/or steam feed conduit
34 air feed conduit
35 outgoing conduit
36 feed-through
41 duckbill valve
42 duckbill valve
43 duckbill valve
51 channel for hot water and/or steam feed conduit
52 channel for air feed conduit
53 channel for outgoing conduit
61 valve housing
62 closure element
63 seal element
64 electromagnet
65 spring
66 securing ring
67 sealing portion
68 seal
71 valve chamber
73 air connection stub
79 mixing nozzle
80 extensive sections
81 joint
82 air feed-through
83 feed-through (for milk)
84 feed-through for hot water or steam
85 feed-through for steam
86 feed-through for hot water or steam
87 duckbill valve
88 duckbill valve
89 mixing nozzle element
90 ring (structure) for positioning ring
91 milk froth outlet continuation
92 opening for the air feed
93 opening for the milk feed
94 positioning ring
95 steam connection opening
96 feed-through conduit
97 mixing nozzle chamber
98 (electrical) contacts
99 mixing nozzle opening
100 drinks preparation system
101 coffee machine
103 placement platform
105 coffee outlet
106 front
107 milk frother platform
108 outlet hood
110 connection location
110' alternative interface
111 steam delivery location
112 hot water and/or steam delivery location
113 electric contacts
121 electronics unit
151 air connection
152 air feed-through
155 tube portion
195 activation
195' alternative activation
200 drinks vessel

The invention claimed is:

1. An appliance for preparing frothed milk, comprising a container for receiving milk, and an electrically operated drive device for delivering and frothing the milk, and a docking element for connection to a drinks preparation machine, said docking element comprising
a connection for steam delivered by the drinks preparation machine;
an interface for electrical current that is supplied by the drinks preparation machine and is for operating the drive device; and
a milk froth outlet for the frothed milk.

2. The appliance according to claim 1, wherein a distance between the milk froth outlet on the one hand and a plane of an end surface of the docking element on the other hand, said end surface comprising the connection for steam and the electrical interface, is maximal 2.5 cm.

3. The appliance according to claim 1, wherein the docking element is designed as a continuous, body-forming element, in whose interior conduits for the milk and steam run.

4. The appliance according to claim 3, wherein the docking element comprises a docking element that is designed as a shaped body of a plastic and forms at least one conduit for milk.

5. The appliance according to claim 3, wherein the docking element comprises a main body with a plurality of fluid channels and a supplementary part, that is reversibly removable from the main body, wherein the supplementary part comprises a material which is softer in comparison to the main body, said supplementary part being continuous and comprising several elements through which milk, steam, water and/or air can flow and which engage into the fluid channels.

6. The appliance according to claim 1, further comprising a milk frothing unit with a gear pump which at an inlet side is connected to a milk feed conduit and to an air feed.

7. The appliance according to claim 1, further comprising a mixing nozzle, in which steam can be brought together with the milk and air, wherein the mixing nozzle is arranged in the docking element and is arranged directly above the milk froth outlet.

8. The appliance according to claim 7, wherein the mixing nozzle is designed to exert a suction effect upon air and/or upon milk flowing into the mixing nozzle, on account of a flow of the steam.

9. The appliance according to claim 1, wherein the docking element further comprises a connection for cleaning water and/or cleaning steam which is/are delivered by the drinks preparation machine, from which connection a cleaning water conduit and/or cleaning steam conduit passes through the docking element.

10. A drinks preparation machine for preparing a hot drink and for to which an appliance according to claim 1 may be connected, comprising a delivery location for steam, for coupling onto the steam connection, and an electrical interface at the drinks preparation machine side, for coupling onto the interface of the appliance, wherein the delivery location and the drinks-preparation-machine-side interface are arranged such that they can be contacted by the interface of the docking element.

11. The drinks preparation machine according to claim 10, wherein a drinks outlet for the hot drink is arranged in direct proximity to the delivery location.

12. The drinks preparation machine according to claim 10, comprising a front with a placement platform that projects from the front and is for receiving a drinks vessel and with a drinks outlet hood projecting from the front above the placement platform, wherein a docking location with the delivery location and with the drinks-preparation-machine-side interface is present laterally on the drinks outlet hood.

13. A drinks preparation system, comprising an appliance according to claim 1, as well as a drinks preparation machine for preparing a hot drink and for to which the appliance may be connected, said drinks preparation machine comprising a delivery location for steam for coupling onto the steam connection, and an electrical interface at the drinks preparation machine side for coupling onto the interface of the appliance, wherein the delivery location and the drinks-preparation-machine-side interface are arranged such that they can be contacted by the interface of the docking element.

14. The drinks preparation system according to claim 13, wherein the drinks preparation system comprises a placement platform for a drinks vessel, and in the docked-on condition of the appliance, the milk froth outlet as well as the drinks outlet of the drinks preparation machine are arranged vertically above the placement platform.

15. The drinks preparation system according to claim 14, wherein a horizontal distance between the milk froth outlet and the drinks outlet at the most is 5 cm in a docked condition.

* * * * *